United States Patent Office 2,785,030
Patented Mar. 12, 1957

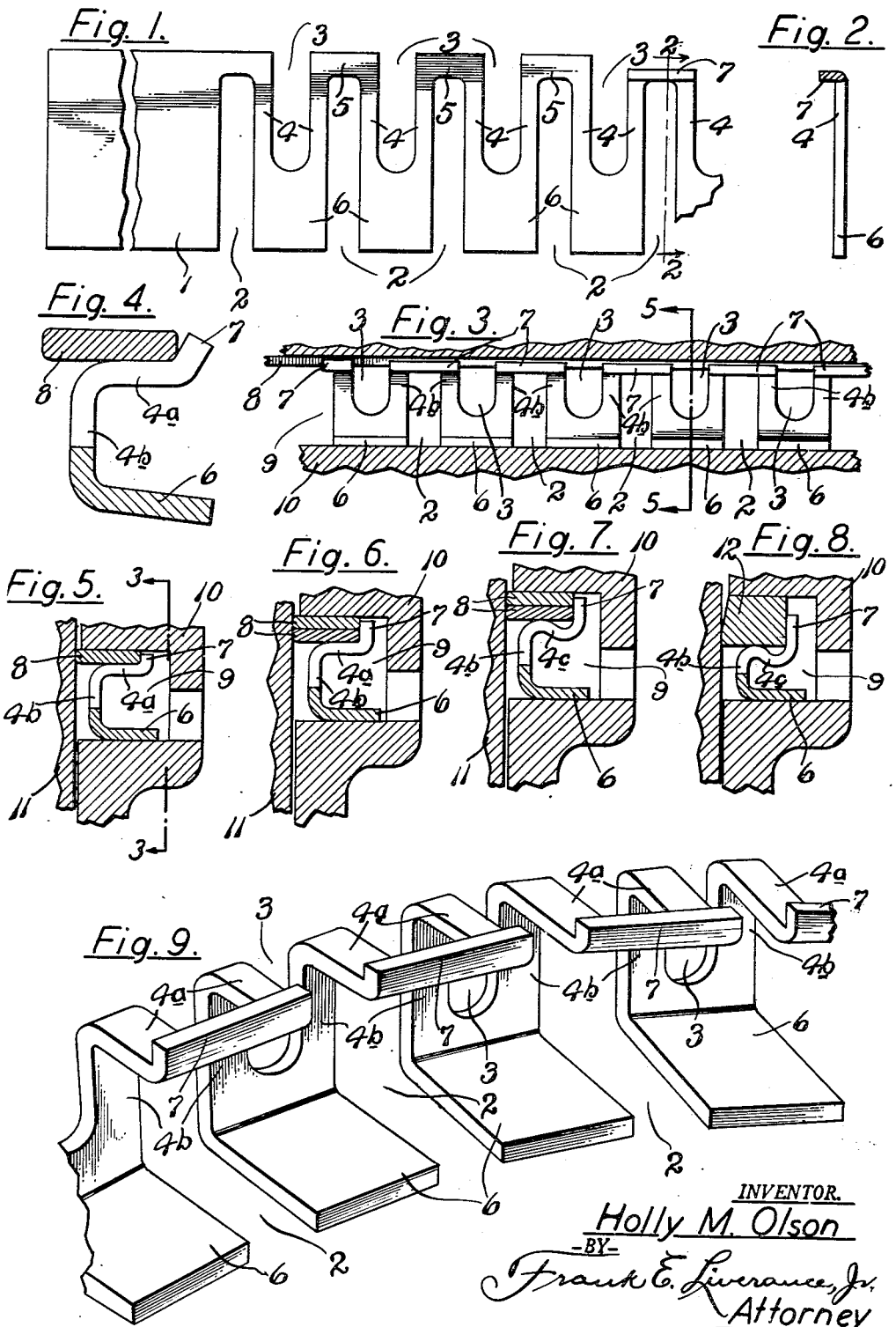

2,785,030

PISTON RING EXPANDER WITH COMPRESSED DUAL ACTION

Holly M. Olson, Muskegon, Mich., assignor to Sealed Power Corporation, Muskegon, Mich., a corporation of Michigan Application May 19, 1955, Serial No. 509,452

2 Claims. (Cl. 309—45)

The present invention relates to a novel structure of compressible ring expander which, in conjunction with an upper thin flat sealing rail or rails, against which the expander exerts both radial and axial pressures, serves to effectually seal against any excess upward passage of lubricating oil between the piston and the cylinder in which it is installed, being particularly useful in connection with high compression, high vacuum and high rotative speeds with consequent high piston reciprocations of internal combustion engines.

The piston ring which I have devised and which embodies my invention is particularly effective in automotive engines in which the pistons have been considerably shortened and the diameter increased, being useful as an oil saving ring, having sufficient tension and of an operating flexing structure that it conforms to the changing irregularities of the cylinder bores of internal combustion engines and of pistons under varying operating temperatures, effectively providing the required seal and maintaining such seal against the varying forces which occur under varying conditions.

It is common practice to use segment rails made of thin flat wire of circular form, being initially formed in multiple in a continuous coil which is cut lengthwise at one side to provide the separate rails. Such segment rails are provided with outer bearing edges, chromium plated, having long wear life, one generally being placed at each side of a piston oil ring groove, with a suitable spacer between the two rails, and an expander to give additional radial outward pressure against the inner edges of the rails whereby uniform contact of the outer chromium edges against the cylinder is attained with low friction and long wear. When two such segment rails are used, spaced from each other, the lower one is not in general subjected to sealing pressure and accordingly functions as an idler or metering ring member, contributing but little if anything in normal engine operation to seal against vacuum and compression induced, leaking passage of lubricant to above such lower oil piston ring.

With my invention the lower idler or metering segment rail is eliminated and in place thereof I use either a single upper segment rail or two of them. Also in place of the segment rails a compression ring may be used, either one rail or two rails, or the compression rail functioning as the sealing member of the piston ring.

In my invention a combined expander and support for the rail, or rails, or the compression ring used is of novel structure and shape, fully engages the inner edges of a rail or rails used, or the compression ring if used, whereby a seal against the cylinder wall is maintained. Further, means are provided to cause an effectual seal against leaks between the upper side of the rail, or upper rail when two are used, or the upper side of a compression ring when it is used, so that the ring provides a very effective and useful seal both radially and axially, salvaging lubricating oil by scraping off any excess thereof, there being full and ample ventilation through such expander and support for excess oil to pass to the bottom of the piston ring groove and thence be drained to the interior of the piston and eventually to the engine crankcase.

In the production of a simple, practical embodiment of my invention, the piston ring where one rail is used or when a compression ring is used will consist of but two parts, the other of which is a circumferentially compressible expander and rail or ring carrier and support which, in free normal state, is longer than the circumferential distance around the bore of the cylinder in which placed. It is compressed in assembly and as thus compressed exerts forces outwardly and uniformly around the inner edges of segment rails or a normal compression ring used and, furthermore, at its lower side bears with an inherent force against the lower side of the piston ring groove in which installed, thereby forcing the upper side of the upper rail or the piston ring which is at the upper side of the ring groove snugly into sealing engagement thereagainst. Such expander and rail or ring support, being thus circumferentially compressible, operates to serve its functions alone without bearing against the bottom of the piston ring groove. Further, with my invention, embodied in its simplest form using one rail segment, a practical, simple, economical and exceptionally effective piston ring is made in two pieces, suitable for all general purpose internal combustion oil ring installations, which in performance does as well or better than the present piston ring used in the same place requiring two rail segments, a spacer between them and an expander back of them, or four pieces to make the complete ring.

Also, by using additionally a second segment rail at minor additional cost with both rails located at the upper side of the ring groove, pressed upwardly and also radially outward, additional and longer life so the piston ring is obtained. By providing rails of different radial dimensions or providing means on the rail expander support so that rails of the same radial depth may be located in slightly staggered relation, the under rail may first serve its purposes alone in bearing against a cylinder wall until worn sufficiently that the outer edges of the other rail used engages against the cylinder wall.

There is also simplicity of assembly and, in addition to a rail or rail being exertmely cheaply produced, the circumferentially compressible expander is of an exceptionally simple structure, easily and inexpensively manufactured.

The above recited factors and advantages of my invention are objects of the invention which are attained by the preferred structure hereinafter described, taken in connection with the accompanying drawing, in which, Fig. 1 is a plan view illustrative of the first steps of operation in forming the circumferentially compressed expander and rail or ring support of my invention.

Fig. 2 is a transverse section substantially on the plane of line 2—2 of Fig. 1, looking in the direction indicated.

Fig. 3 is an inner plan view of a piston ring incorporating my invention installed in its piston ring groove, upper and lower portions of the piston being shown on the plane of line 3—3 of Fig. 5.

Fig. 4 is a somewhat enlarged transverse section through a piston ring of my invention.

Fig. 5 is a fragmtary vertical section substantially on the plane of line 5—5 of Fig. 3.

Figs. 6, 7 and 8 are like sections showing slightly different forms of installed piston rings in a piston and, in Figs. 7 and 8, slightly different forms of the expander and rail or ring supports, and Fig. 9 is a much enlarged fragmentary perspective view of a section or portion of the novel expander and support of my invention.

Like reference characters refer to like parts in the different figures of the drawing.

In producing the circumferentially compressible expander and rail or ring support, flat thin ribbon stock, indicated at 1, has transverse slots 2 and 3 at right angles to the length of the ribbon alternately cut from opposite side edges, providing spaced slots 2 and the alternate slots 3 between slots 2. The slots 3 are of less depth than the slots 2, there being left between the overlapping portions of the slots 2 and 3 spaced legs 4 connected at their outer end portions at the edge of the ribbon stock where the slots 3 are located by integral cross connecting portions 5. At their inner ends the legs 4 are connected by a longer section 6 which exceeds the connecting portions 5 in width as shown.

The parts 5 are turned at an angle which may be at right angles as in Fig. 2, or inclined inwardly from a right angle as in Fig. 4, making lips 7 which reach substantially to the inner closed ends of the slots 2.

The legs 4 are then formed and shaped so that, together with the larger connecting portions 6, a generally channel form in cross section is made, the upper sides of which at 4a are the upper portions of the legs 4, the lower side being provided by the sections 6 and the connecting web portions between by the lower portions 4b of the legs 4 and a short section of the inner portions of the parts 6. Preferably, as in Fig. 4, the lower flanges 6 of the channel are not parallel to the parts 4a but are downwardly and inwardly inclined at an acute angle to the horizontal as shown.

A preselected length sufficient for using in a piston ring groove of a piston of a standard diameter is shaped into circular form. This preselected length is greater than the circumferential length of the ring groove of the piston so that when inserted in the piston the two ends of the compressible member abut against each other, and there must be a circumferential compression and lessening of the normal circumference thereof when installation in an engine cylinder takes place.

One or more rail segments 8 which are of circular form and parted at one side may be placed against the upper sides of the parts 4a, with their inner edges against the upwardly extending lips 7. The lips 7 when two of the rails, as in Figs. 6 and 7 are used, are increased in height but in all cases have their upper edges short of the upper side of a piston groove 9 in which installed, made in a piston 10 adapted to be installed within a cylinder 11, fragmentary portions of the piston and cylinder being shown in Figs. 3 and 5 to 8 inclusive. Also in place of the rails 8 a parted piston ring 12 of solid form and generally rectangular in cross section may be used. The parts of said expander and support against which the rails or the ring 12 are located may, as in Figs. 5 and 6, be parallel to the sides of the rail or ring engaging thereagainst, or bent into the form shown in Figs. 7 and 8 as at 4c.

Such assembled piston rings are in general used in the lower oil rings of pistons from which drainage passages extend from the bottom of the ring grooves to the interior of the piston. The circumferentially compressible expander and rail support, because of the force exerted in compressing and reducing its circumferential length, exerts outwardly directed radial force against the rails 8 or ring 12 around the same. The downwardly and inwardly inclined lower sections 6 which must be strained to horizontal position when installed in a ring groove, as in Figs. 5 to 8 inclusive, exert an upwardly directed axial force pressing the rail in Fig. 5, or the upper rail in Figs. 6 and 7, and also the ring in Fig. 8, against the upper side of the ring groove, thereby providing an effective seal against passage or leakage of lubricant from above the piston ring to the ring groove 9. Such sealing action is attained irrespective of whether the lips 7 extend upwardly vertically as shown in Figs. 5 to 8 or inclined to the rear as in Fig. 4. However, the inclination to the rear shown in Fig. 4 has advantages when two of the rails 8 are used, as in Figs. 6 and 7, as the upper rail will not be initially forced outwardly to contact the cylinder wall but only after the lower rail has worn a predetermined amount.

The structure described provides a very practical, simple and economically constructed piston oil ring which when one rail is used completes the piston ring using but two parts, very easily installed. The same is true also when a ring 12 is used, as in Fig. 8, and there is merely the addition of one segment rail 8 when two of the rails are used as in Figs. 6 and 7. The oil scraped downwardly on the downstroke of the piston by the rails 8 or ring 12 has large vent openings for escape thereof to the bottom of the ring groove 9 and thence to the interior of the piston.

The invention is defined in the appended claims and is to be considered comprehensive of all forms of structure coming within their scope.

I claim:

1. A parted, circular piston ring structure, comprising, a successive series of spaced lower generally horizontal bearing sections having slots between them, each section at its outer end having an integral generally vertical extension, provided with a generally centrally disposed additional slot between its side edges, thereby forming spaced legs, one at each side of each additional slot, said legs having lower vertical portions, and upper, integral, spaced, generally horizontal portions extending inwardly, and a generally vertical lip integrally connecting the inner ends of two adjacent upper horizontal portions of said legs located one lip across each of said first mentioned slots, and a parted cylinder bearing ring above said ring structure outwardly of said lips and extending outwardly beyond said ring structure.

2. In a piston ring, a circumferentially compressible rail supporting member comprising, a successive series of spaced horizontal U-shaped segments, each comprising upper and lower, spaced portions, and a web portion integral with and connecting the outer ends of said upper and lower portions, integral lips connecting the upper portions of successive segments at inner ends thereof, each upper portion of each U-segment having a generally centrally located slot between adjacent side edges extending from the inner end of the upper portion thereof to the web and downwardly into said web for a portion of the length thereof, and a cylinder bearing ring supported by said member outwardly of said lips and extending outwardly beyond said supporting member.

References Cited in the file of this patent
UNITED STATES PATENTS

| | | |
|---|---|---|
| 2,277,926 | Mayfield | Mar. 31, 1942 |
| 2,635,022 | Shirk | Apr. 14, 1953 |
| 2,695,825 | Estey | Nov. 30, 1954 |